Figure 1:
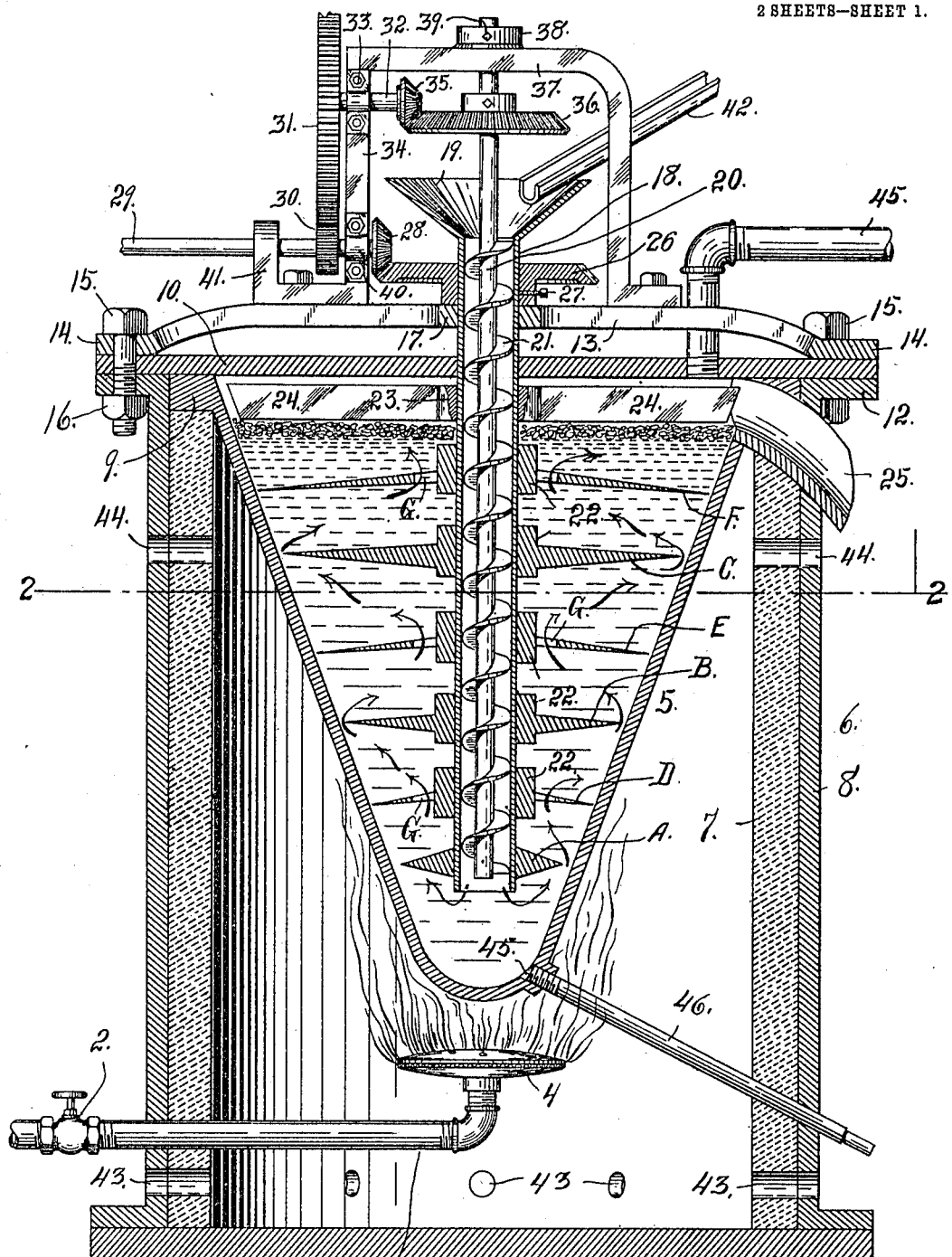

N. H. FREEMAN.
RETORT FURNACE.
APPLICATION FILED DEC. 16, 1907.

949,178.

Patented Feb. 15, 1910.

2 SHEETS—SHEET 1.

Witnesses
I. D. Thornburgh
Otto E. Hoddick

Inventor
N. H. Freeman
By A. H. Miller, Attorney

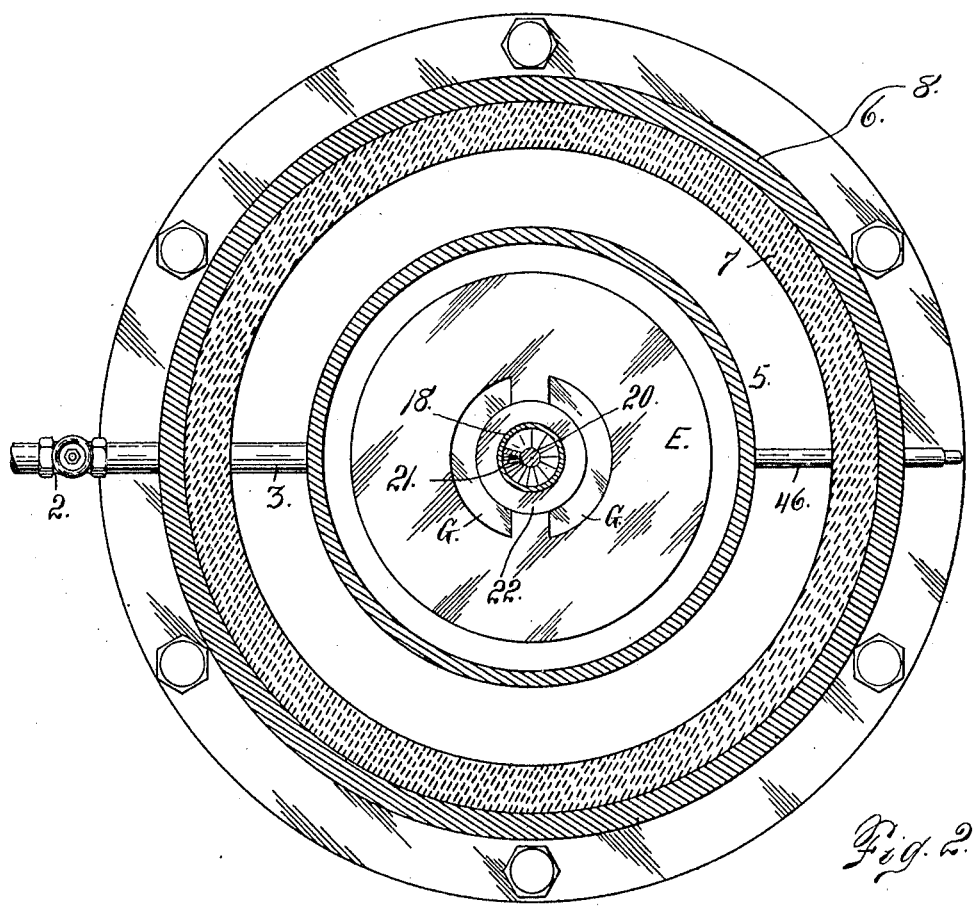

UNITED STATES PATENT OFFICE.

NAT H. FREEMAN, OF BOULDER, COLORADO.

RETORT-FURNACE.

949,178.  Specification of Letters Patent.  Patented Feb. 15, 1910.

Application filed December 16, 1907. Serial No. 406,645.

*To all whom it may concern:*

Be it known that I, NAT H. FREEMAN, a citizen of the United States, residing at Boulder, in the county of Boulder and State of Colorado, have invented certain new and useful Improvements in Retort-Furnaces; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.
My invention consists of a furnace in which the metallic values are recovered from their ores by fusion, the pulverized ore being introduced into the lower portion of a mass of molten metal and caused to travel up through the metal whereby all fusible values are reduced to a molten state and unite with the mass of molten metal within the retort. The retort is incased and is heated in any suitable manner whereby the original contents of the retort are kept in a molten condition notwithstanding the introduction thereto of the ores whose metallic values are to be recovered.

As shown in the drawing a rotatable conduit is suspended in the retort and upon it is mounted disks whose outer peripheries or edges extend nearly to the walls of the retort. Every alternate disk is provided with openings located near the conduit through which the material as it passes upwardly through the molten mass, is caused to travel. Every other alternate disk is free from openings and the material passing upwardly through the molten mass must pass around the outer edges of the last named disks or between their edges and the wall of the retort. By virtue of this construction the material fed to the retort and passing upwardly therethrough is obliged to take a zigzag course. During this upward travel the metallic contents of the ore are reduced to a molten state while the non-fusible ash gathers on top of the molten mass and is removed by skimmer blades or arms which are attached to the rotatable conduit above the disks. These disks also serve as agitating devices whereby the pulverized material is distributed through the molten mass. The material is fed into the bottom of the retort by a worm or feed screw located in the rotatable conduit, the screw being rotated independently of the conduit.

Having briefly outlined my improved construction, I will proceed to describe the same in detail reference being made to the accompanying drawing in which is illustrated an embodiment thereof.

In this drawing, Figure 1 is a vertical longitudinal section taken through my improved furnace. Fig. 2 is a horizontal section taken on the line 2—2 Fig. 1 looking downwardly. Fig. 3 is a top plan view in detail illustrating one of the disks mounted on the rotatable conduit.

The same reference characters indicate the same parts in all the views.

Let the numeral 5 designate what I will term a retort adapted to contain a mass of molten metal as lead. This retort may be approximately full of molten metal at the beginning of the operation. The retort is suspended within a casing 6 having a fire brick lining 7 surrounded by an outer wall 8 which may be composed of metal. As shown in the drawing the retort is approximately cone-shaped, with the point of the cone lowermost. Its upper edge is provided with a circular flange 9 which rests upon the upper edge of the fire clay lining 7 of the casing. This flange 9 is clamped in place by means of a cover 10 which rests on top of the retort and also overlaps an exteriorly projecting horizontally disposed flange 12 formed on the outer wall of the casing. Above the cover 10, is located a spider 13. The outer portion 14 of this spider, is connected with the disk 10 and the flanges 12 by means of bolts 15 to which are applied nuts 16. The spider inside of its outer portion 14, projects upwardly above the cover 10 and its central web 17 is provided with an opening through which passes a centrally located sleeve or conduit 18 having a funnel-shaped mouth 19. Within this conduit 18 is located a feed screw 20 whose spiral thread 21 fits closely within the conduit. The cover 10 is provided with an opening registering with the opening in the web 17, through which the rotatable conduit passes. Attached to the sleeve 18 and located within the retort 5, is located a number of disks which diminish in size from top to bottom, in order to harmonize with the general construction of the retort as heretofore outlined.

As shown in the drawing the disks which are devoid of openings are designated A, B and C respectively, while those provided with openings are designated D, E, and F. The openings in the last named disks are designated G. Each disk above the lowermost is provided with a hub 22 directly connected with the conduit 18. Attached to the conduit above the uppermost disk, is a skimmer composed of a hub 23 made fast to the conduit exteriorly and having radial wings 24, for the purpose of skimming or removing the non-fusible ash from the top of the molten mass and causing it to pass outwardly through an opening in the casing by means of a chute or trough 25 located at the upper edge of the apparatus and extending through the upper portion of the casing.

As shown in the drawing a gas burner 4 is arranged within the casing below the bottom of the retort for supplying the necessary heat to maintain the metal within the retort in a molten condition. This burner is connected with a supply pipe 3 provided with a valve 2.

To the upper extremity of the conduit 18, above the spider 13 a gear 26 is secured by means of a set bolt 27. This gear meshes with a small bevel gear 28 fast on a shaft 29 operated from any suitable power. This shaft is journaled in a box 40 and also in an upwardly projecting part 41 constituting a portion of the frame work and resting upon the spider 13. This shaft 29 is also provided with a pinion 30 meshing with a relatively large gear 31 fast on a short shaft 32. This shaft 32 is journaled in a box 33 mounted on an upright 34 resting on top of the spider 13 and is provided with a bevel pinion 35 meshing with a relatively large gear 36 fast on the upper portion of the worm spindle. The upper extremity of this spindle passes through a frame plate 37. Above this frame plate a disk 38 is made fast to the spindle by a set bolt 39. This disk maintains the worm in a suspended position within the rotary conduit.

When the apparatus is in use, the material to be treated is fed through a trough or chute 42 into the funnel-shaped mouth 19 of the rotary conduit 18. Power being applied to the shaft 29, the feed screw is rotated to carry the material downwardly through the rotary conduit and discharge it into the bottom of the retort. It is assumed that this retort is filled or approximately filled with molten metal at the beginning of the operation. Simultaneously with the rotation of the feed screw, a rotary movement is also imparted to the conduit 18 together with its disks. This rotation of the conduit maintains the material within the retort in a state of agitation and facilitates the intermingling of the pulverized ore with the molten mass. This pulverized material after entering the bottom of the retort, passes upwardly through the molten mass in a zigzag path as indicated by the arrows in Fig. 1. During this upward movement, the metallic values of the ore are reduced to a molten condition while the non-fusible ash collects on top of the molten mass and is removed therefrom by the skimmer blades 24 and caused to pass out of the retort through the trough 25.

The casing is provided near its bottom with openings 43 for the entrance of atmospheric air. This casing is also provided with upper openings 44 to maintain a circulation of atmospheric air within the casing in order to supply the fuel gas with the necessary oxygen for purposes of combustion. The fumes from the retort are carried away through a conduit 45 which may be connected with a stack.

During the operation of the apparatus, the metal in the material to be treated as it becomes molten, unites with the already molten mass within the retort and increases its volume. Hence provision must be made for drawing off the molten metal from the retort in order to prevent its overflow through the ash trough 25. To this end the lower extremity of the retort is provided with an opening 45 with which is connected a conduit 46 through which the molten material may be drawn off either constantly or at intervals as may be desired.

It is intended that the disks D, E and F having the openings G, should have their outer edges or peripheries practically in contact with the inner surface of the retort, in order to compel the material to take the zigzag course heretofore described. In the drawing these disks are shown as close to the inner wall of the retort as is practicable without bringing them in actual rubbing contact therewith.

Having thus described my invention, what I claim is:

A retort furnace, comprising an inverted cone-shaped, molten-metal-containing receptacle, a plate secured to the top thereof, a conduit passing through the top plate of the receptacle and projecting downwardly near the bottom thereof, its extremities being open, the conduit being journaled in the said top plate and provided with disks arranged thereon, one above the other, and suitably separated, each alternate disk having its periphery close to the wall of the retort, and being provided near the conduit with openings, the other alternate disk being free from openings, sufficient space being left between their outer peripheries and the inner surface of the retort to allow the material to travel between the disks and the wall of the retort, and means for introducing ore in pulverized form into the bottom of the retort, through the said conduit, a feed screw being located within the conduit and mounted to rotate independently on the latter, and skimmer blades to remove the ash, the said blades being connected with the upper extremity of the conduit and arranged to rotate therewith, the retort being provided at its top with an outlet for the ash as it is removed from the top of the molten mass by the skimmer blades, substantially as described.

In testimony whereof I affix my signature in presence of two witnesses.

NAT H. FREEMAN.

Witnesses:
L. A. EWING,
FRED. G. FOLSOM.